United States Patent
Chang et al.

(10) Patent No.: US 7,167,430 B2
(45) Date of Patent: Jan. 23, 2007

(54) METHOD AND RELATED APPARATUS FOR GENERATING FIXED PACKETS WHILE WRITING DATA TO CDS

(75) Inventors: Chi-Hsiang Chang, Taipei (TW); Jenn-Ning Yang, Taipei (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 304 days.

(21) Appl. No.: 10/711,283

(22) Filed: Sep. 7, 2004

(65) Prior Publication Data

US 2005/0268030 A1 Dec. 1, 2005

(30) Foreign Application Priority Data

May 28, 2004 (TW) ................ 93115254 A

(51) Int. Cl.
*G11B 27/36* (2006.01)
(52) U.S. Cl. ................ 369/53.31; 369/53.36
(58) Field of Classification Search ............ None
See application file for complete search history.

(56) References Cited

U.S. PATENT DOCUMENTS

| | | | | |
|---|---|---|---|---|
| 5,696,558 A | * | 12/1997 | Tsukamoto | 386/109 |
| 5,873,112 A | * | 2/1999 | Norman | 711/103 |
| 5,974,223 A | * | 10/1999 | Uchide | 386/109 |
| 5,986,980 A | * | 11/1999 | Takeshita et al. | 369/30.23 |
| 6,134,626 A | * | 10/2000 | Inokuchi et al. | 711/4 |
| 6,950,443 B1 | * | 9/2005 | Kaneko | 370/474 |
| 2002/0101803 A1 | | 8/2002 | Hayashi et al. | |
| 2004/0005142 A1 | * | 1/2004 | Yoo et al. | 386/94 |

FOREIGN PATENT DOCUMENTS

TW 540032 7/2003

* cited by examiner

*Primary Examiner*—Thang V Tran
(74) *Attorney, Agent, or Firm*—Winston Hsu

(57) ABSTRACT

Method and related apparatus for generating fixed packets while writing data into CDs. The present invention records a total-block number of a write-in data with a counter, and a waiting-coding number with another counter, so as to generate fixed packets efficiently and correctly, and prevent buffer under run when writing the write-in data to the CD.

6 Claims, 3 Drawing Sheets

METHOD AND RELATED APPARATUS FOR GENERATING FIXED PACKETS WHILE WRITING DATA TO CDS

BACKGROUND OF INVENTION

1. Field of the Invention

The present invention provides a method for generating fixed packets while writing data into CDs and related apparatus, and more particularly, a method for generating fixed packets with counters counting non-encoded data.

2. Description of the Prior Art

In modern information society, small, light, high-density, and low-cost optical disks have become one of the most popular non-volatile storage media. As high-speed optical disk drives capable of recording become popular, buffer under run becomes a serious problem. So-called buffer under-run occurs when a sequence of write-in data of a computer flows with a higher speed than an optical disk drive of the computer burns. In other words, a burning program of the computer reads data from a hard disk or an optical disk, and stores the read data in a buffer of the optical disk drive pending being written to an optical disk. Because the data in the hard disk or the optical disk is not continuous (that is, the buffer is sometimes full, and sometimes empty), once the buffer is empty, buffer under-run takes place.

One common cause of buffer under-run occurs when a user executes another program while burning is taking place. The computer has to stop transmitting data to the optical disk drive in order to boot the required program from the hard disk and rearrange system resources. Another cause is data source errors (like surface damage on the source optical disk), so that the computer is unable to find data, in turn causing the buffer to empty and so leading to buffer under-run.

A prior art optical disk drive can prevent buffer under-run by means of fixed packet burning, which means that the drive divides a sequence of data into a plurality of fixed packets, and inserts data between two fixed packets for connecting and separating the fixed packets before writing these fixed packets to an optical disk. The method of fixed packet burning prevents buffer under-run completely, consequently burning data by means of fixed packet burning with lower cost of product and higher efficiency has become a key development issue for modern information companies.

Please refer to FIG. 1, which illustrates a schematic diagram of a prior art fixed packet 10. The fixed packet 10 includes a front data FC (including 5 blocks generally), a partial write-in data PD (including 32 blocks generally), and a back data BC (including 2 blocks generally). The purpose of the front data FC is to indicate a start of the fixed packet 10. The partial write-in data PD is a part of the write-in data, which has been encoded into the fixed packet 10. The purpose of the back data BC is to indicate an end of the fixed packet 10. If a prior art optical disk drive of a computer burns write-in data into an optical disk by means of fixed packet burning, the drive moves and inserts data in the write-in data stored in a hard disk of the computer to transform the write-in data into a plurality of fixed packets, as shown in FIG. 1, and then burns the fixed packets into the optical disk.

However, the prior art fixed packet burning should move and insert data in the computer, which decreases burning speed and efficiency especially when burning data and executing programs at the same time, and may cause burning error if some error takes place when moving data.

In summary, the prior art fixed packet burning operates with low efficiency, and may cause burning error.

SUMMARY OF INVENTION

It is therefore a primary objective of the claimed invention to provide a method for generating fixed packets while writing data to CDs.

According to the claimed invention, a method for encoding a sequence of data into a plurality of fixed packets for writing to an optical disk, includes the following steps: (a) adjusting a first block count when receiving a block data of a sequence of data; (b) comparing the first block count with a default block count; (c) encoding received unencoded data into a fixed packet when the first block count fits the default block count in step (b); and (d) writing the coded fixed packet into the optical disk.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
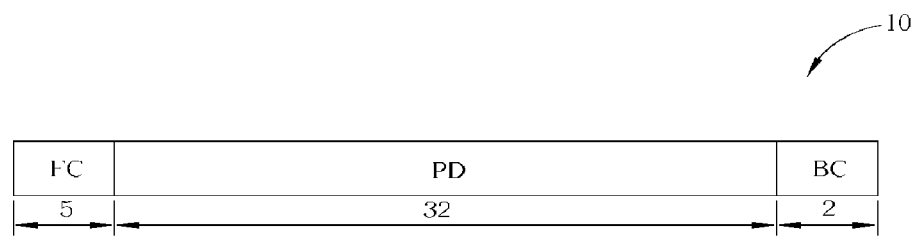
FIG. 1 illustrates a schematic diagram of a prior art fixed packet.
Figure 2:
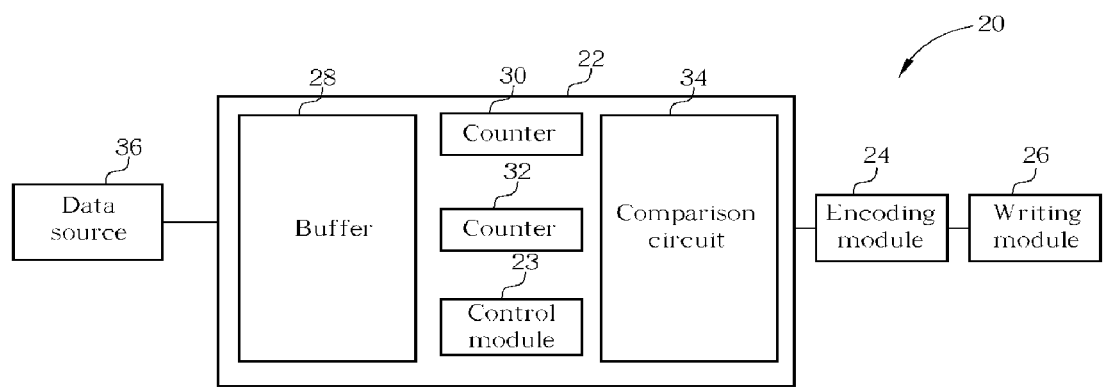
FIG. 2 illustrates a block diagram of an optical disk drive in accordance with the present invention.

Please refer to FIG. 2, which illustrates a block diagram of an optical disk drive 20 capable of recording in accordance with the present invention. The optical disk drive 20 includes a processing circuit 22, an encoding module 24, and a writing module 26. The processing circuit 22 includes a control module 23, a buffer 28, counters 30, 32, and a comparison circuit 34. The control module 23 controls operations of the processing circuit 22. The buffer 28 registers data provided by a data source 36, and is controlled to output the registered data to the encoding module 24 with the control module 23. The counters 30 and 32 record counts W0 and B0 respectively, where the count W0 indicates the total block number of a sequence of write-in data, and the count B0 indicates the block number of the received (but initially unencoded) data of the processing circuit 22. The counters 30 & 32 can adjust (increase or decrease) the counts W0 & B0 while the processing circuit 22 receives a block data, and is controlled to adjust the counts W0 & B0 with the control module 23. The comparison circuit 34 determines whether the counts W0 & B0 reach defaults, and transmits the decision result to the control module 23. The control module 23 controls the buffer 28 to output the registered data to the encoding module 24 with the decision result of the comparison circuit 34. Together with the control module 23, the buffer 28, the counters 30 & 32, and the comparison circuit 34, the processing circuit 22 can transform a sequence of data provided by the data source 36, to a plurality of fixed-length block data for the encoding module 24 to add a front data FC in front of a fixed-length block data and a back data BC in the back, so as to form a plurality of fixed packets for the writing module 26 to write to an optical disk. Because the fixed packet 10 includes the 5-block front data FC, the 32-block partial write-in data PD, and the 2-block back data BC as illustrated in FIG. 1, the processing circuit 22 transmits the received 32-block data provided by the data source 36 to the encoding module 24, then the encoding module 24 adds a 5-block front data FC and a 2-block back data BC in front and back (respectively) of the 32-block data, so as to form a 39-block (5+32+2) packet for the writing module 26 to write into the optical disk.

Figure 3:
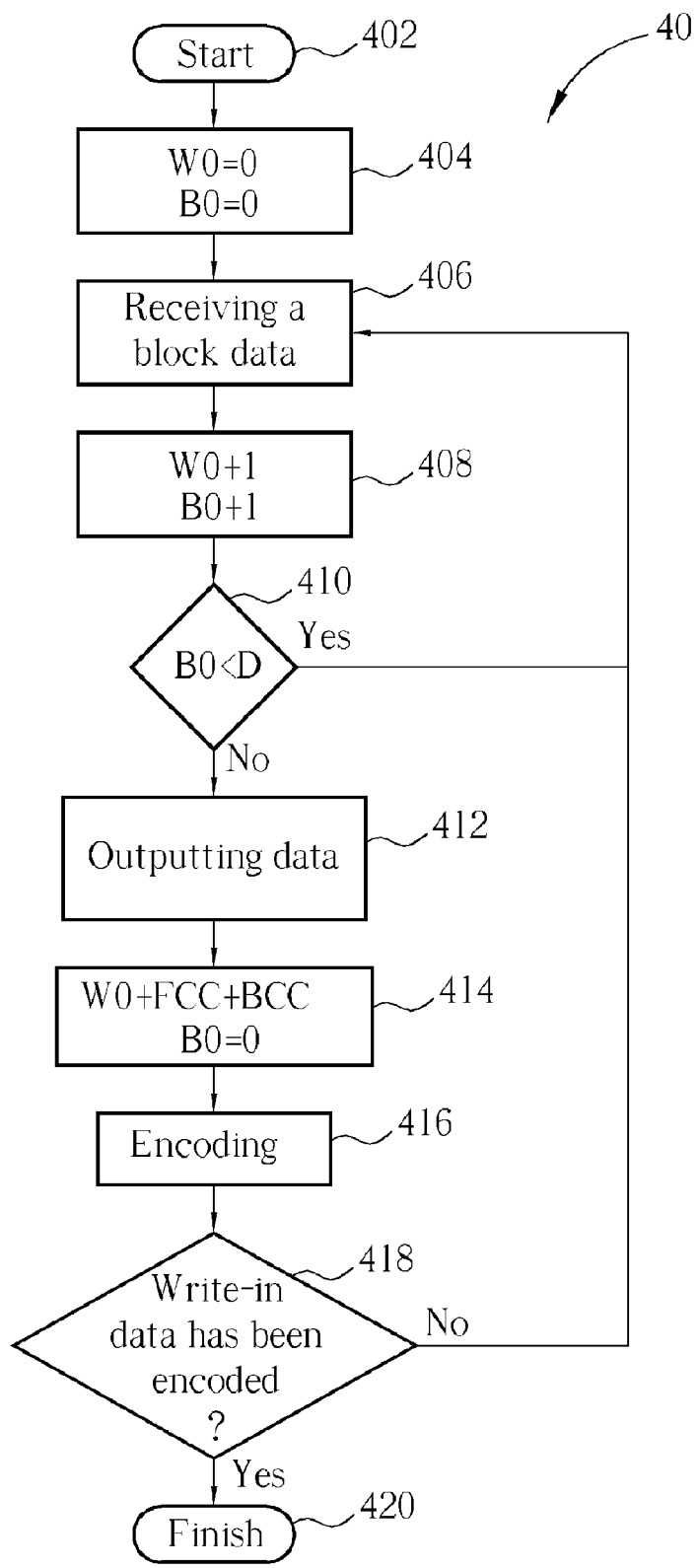
FIG. 3 and FIG. 4 illustrate flowcharts of two embodiments in accordance with the present invention.

Please refer to FIG. 3, which illustrates a flowchart of a preferred embodiment process 40 of the optical disk drive 20 when encoding a sequence of write-in data to a plurality of fixed packets. The process 40 includes following steps:

Step 402: Start. The optical disk drive 20 starts to encode a sequence of write-in data of the data source 36 by means of fixed packet burning.

Step 404: Setting the counts W0 & B0 of the counters 30 & 32 to zero. The control module 23 of the processing circuit 22 in the optical disk drive 20 resets the counters 30 & 32 (in this embodiment, initial statuses of the counters 30 & 32 are such that the counts W0 and B0 are zero).

Step 406: Receiving a block data. The processing circuit 22 receives a block data provided by the data source 36 and stores it in the buffer 28.

Step 408: Imcrementing the counts W0 & B0. The control module 23 of the processing circuit 22 in the optical disk drive 20 increments the counts W0 & B0 of the counters 30 & 32 by one.

Step 410: Comparing the count B0 of the counter 32 with a default block length D (in this embodiment, the default block length D is 32). The comparison circuit 34 of the processing circuit 22 in the optical disk drive 20 compares the count B0 of the counter 32 with the default block length D. If the count B0 is smaller than the default block length D, the process 40 reverts to step 406, or else, the process 40 proceeds to step 412.

Step 412: outputting data stored in the buffer 28 to the encoding module 24.

Step 414: adding a default front-data count FCC and a default back-data count BCC to the count W0 of the counter 30 (in this embodiment, the front-data count FCC equals 5, and the back-data count BCC equals 2), and resetting the counter 32.

Step 416: encoding the received data of the encoding module 24 to the fixed packet 10. After receiving fixed-size data (in this embodiment, the fixed-size is 32 blocks) from the buffer 28 of the processing circuit 22, the encoding module 24 adds the front data FC and the back data BC in front of and behind (respectively) the fixed-size data. The block length of the front & back data FC & BC, equal the front-data count FCC and the back-data count BCC.

Step 418: determining if all the write-in data has been encoded. If true, the process 40 proceeds to step 420, or else, reverts to step 406.

Step 420: finish.

In short, as the present invention optical disk drive 20 starts to burn data provided by the data source 36 by means of fixed packet burning, the control module 23 of the processing circuit 22 resets the counters 30 & 32 (that is, sets the counts W0 & B0 to equal 0), and registers the data into the buffer 28 block by block. Meanwhile, once a block data is registered, the counts W0 and B0 are incremented by 1. Then, the comparison circuit 34 of the processing circuit 22 compares the count B0 with the default block length D, which is the block length of the partial write-in data PD of the fixed packet 10 in FIG. 1. By comparing the count B0 and the default block length D, the processing circuit 22 can determine whether data stored in the buffer 28 is reaching the block length of the partial write-in data PD of the fixed packet 10. If the count B0 is smaller than the default block length D, data in the buffer 28 is insufficient to form the fixed packet 10, and the processing circuit 22 proceeds to receive next block data from the data source 36. Otherwise, if the count B0 reaches the default block length D, data in the buffer 28 is sufficient to form the fixed packet 10, so the processing circuit 22 outputs data in the buffer 28 to the encoding module 24, and resets the counter 32, which means that data in the buffer 28 has been encoded to the fixed packet 10. Meanwhile, the processing circuit 22 adds the front-data count FCC and the back-data count BCC to the count W0 of the counter 30, meaning that the amount of data dealt with by the encoding module 24 is W0+FCC+BCC blocks. The encoding module 24 adds the front data FC and the back data BC in front and behind (respectively) the received data for outputting the fixed packet 10 to the writing module 26 for writing to the optical disk. After that, the processing circuit 22 proceeds to receive next block data until the write-in data has been written to the optical disk.

Except for accumulation in the counter 30 & 32, the processing circuit 22 can adjust the counts W0 & B0 with other methods. For example, the count W0 can be the total block-number of the write-in data, and the control module 23 of the processing circuit 22 subtracts 1 from the count W0 of the counter 30 while receiving a block data. In addition, the count W0 is not added the front-data count FCC and the back-data count BCC while the processing circuit 22 outputs data stored in the buffer 28 to the encoding module 24. Therefore, once the count W0 equals 0, the write-in data has been encoded. By the same token, the initial status of the counter 32 can be such that the count B0 equals the default block length D, and the control module 23 of the processing circuit 22 subtracts 1 from the count B0 of the counter 32 while receiving a block data. In this case, once the count B0 equals 0, the buffer 28 has stored sufficient data to form the partial write-in data PD of the fixed packet 10.

Figure 4:
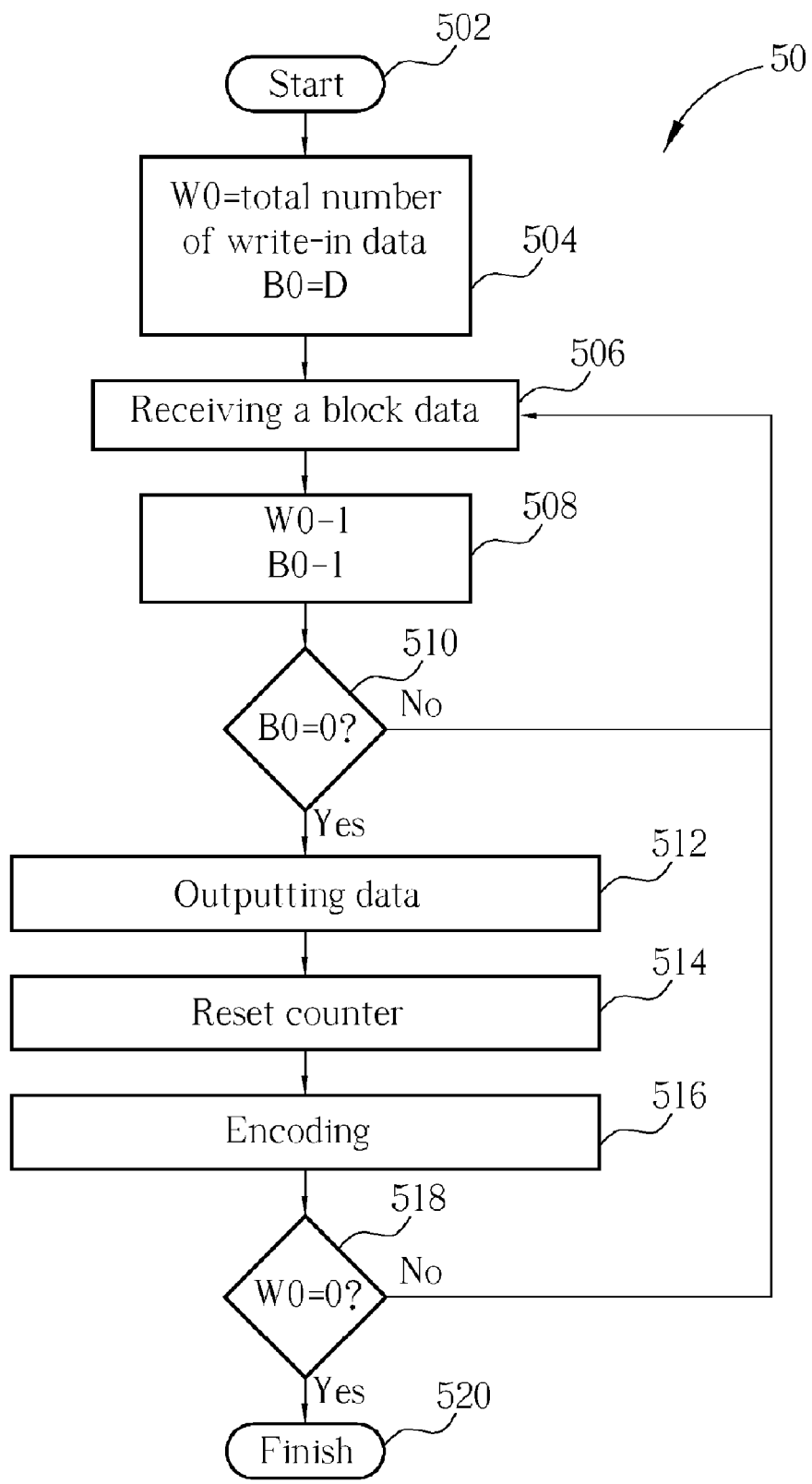

Please refer to FIG. 4 (also FIG. 2), which illustrates a flowchart of a process 50 of the optical disk drive 20 when encoding a sequence of write-in data to a plurality of fixed packets. The process 50 includes following steps:

Step 502: start. The optical disk drive 20 starts to encode a sequence of write-in data of the data source 36 by means of fixed packet burning.

Step 504: setting the count W0 of the counter 30 to equal the total block number of the write-in data, and the initial status of the counter 32 so that the count B0 equals the default block length D.

Step 506: receiving a block data. The processing circuit 22 receives a block data provided by the data source 36 and stores it in the buffer 28.

Step 508: decrementing the counts W0 & B0 by one. The control module 23 of the processing circuit 22 in the optical disk drive 20 subtracts one from both counts W0 & B0 of the counters 30 & 32.

Step 510: determining whether the count B0 of the counter 32 equals 0. The comparison circuit 34 of the processing circuit 22 in the optical disk drive 20 compares the count B0 of the counter 32 with 0. If the count B0 is greater than 0, the process 50 reverts to step 506, or else, the process 50 proceeds to step 512.

Step 512: outputting data stored in the buffer 28 to the encoding module 24.

Step 514: resetting the counter 32.

Step 516: encoding the received data of the encoding module 24 to the fixed packet 10. After receiving fixed-size data (in this embodiment, the fixed-size is 32) from the buffer 28 of the processing circuit 22, the encoding module 24 adds the front data FC and the back data BC in front and behind (respectively) the fixed-size data.

Step 518: determining whether the count W0 equals 0. If true, the process 50 proceeds to step 520, or else reverts to step 506.

Step 520: finish.

Therefore, according to the process 50, when the present invention optical disk drive 20 starts to burn data provided by the data source 36 by means of fixed packet burning, the control module 23 of the processing circuit 22 sets the count W0 of the counter 30 corresponding to the total block number of the write-in data and the count B0 of the counter 32 corresponding to the default block length D (or 32), and registers the data into the buffer 28 block by block. Meanwhile, once a block data is registered, the counts W0 and B0 are each decremented by 1. Then, the comparison circuit 34 of the processing circuit 22 compares the count B0 with 0. By comparing the count B0 to 0, the processing circuit 22 can determine whether data stored in the buffer 28 is reaching the block length of the partial write-in data PD of the fixed packet 10. If the count B0 is greater than 0, data in the buffer 28 is insufficient to form the fixed packet 10, and the processing circuit 22 proceeds to receive next block data from the data source 36. Otherwise, if the count B0 equals 0, data in the buffer 28 is sufficient to form the fixed packet 10, so the processing circuit 22 outputs data in the buffer 28 to the encoding module 24, and resets the counter 32, which means that data in the buffer 28 has been encoded to the fixed packet 10. The encoding module 24 adds the front data FC and the back data BC in front and behind (respectively) of the received data for outputting the fixed packet 10 to the writing module 26 for writing to the optical disk. Then, the comparison circuit 34 determines whether the count W0 of the counter 30 equals to 0. After that, the processing circuit 22 proceeds to receive next block data until the write-in data has been written to the optical disk. If the count W0 is greater than 0, the processing circuit 22 proceeds to receive next block data; otherwise, if the count W0 equals 0, the write-in data has been encoded, thus terminating the process 50.

In summary, when encoding data to the fixed packets 10 for burning, the present invention optical disk drive 20 performs data movement in the computer highly efficiently, stably, and avoids buffer under-run.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for encoding a sequence of data into a plurality of fixed packets for writing to an optical disk, comprising following steps:
   (a) adjusting a first block count when receiving a block data of the sequence of data;
   (b) comparing the first block count with a default block count;
   (c) encoding the received unencoded data into a fixed packet when the first block count fits the default block count in step (b); and
   (d) writing the coded fixed packet into the optical disk.

2. The method of claim 1, wherein step (a) further comprises adjusting a second block count when receiving a block data of the sequence of data, and step (c) comprises adjusting the second block count according to a front-data number and a back-data number when the first block count reaches the default block count of step (b).

3. The method of claim 2, wherein step (c) further comprises attaching a front-data number of blocks and a back-data number of blocks to the front and back of the received unencoded data respectively, when the first block count equals the default block count of step (b).

4. The method of claim 1, wherein step (c) further comprises resetting the first block count when the first block count equals the default block count of step (b).

5. An optical disk drive for writing a sequence of data into an optical disk by means of fixed packet burning, comprising:
   a first counter for adjusting a first block count when receiving a block data of the sequence of data;
   a comparison circuit for comparing the first block count with a default block count;
   an encoding module for encoding the received unencoded data into a fixed packet when the first block count fits the default block count; and
   a writing module for writing the coded fixed packet to the optical disk.

6. The optical disk drive of claim 5, further comprising a second counter for adjusting a second block count when receiving a block data of the sequence of data, or when a comparison result of the comparison circuit indicates that the first block count fits the default block count.

* * * * *